United States Patent
Kim et al.

(10) Patent No.: US 10,343,721 B2
(45) Date of Patent: Jul. 9, 2019

(54) FRONT VEHICLE BODY REINFORCING STRUCTURE

(71) Applicants: HYUNDAI MOTOR COMPANY, Seoul (KR); KIA MOTORS CORPORATION, Seoul (KR)

(72) Inventors: Do Hoi Kim, Anyang-si (KR); Jongduk Yu, Hwaseong-si (KR); Chang Ho Park, Suwon-si (KR); Sung Woo Kim, Hwaseong-si (KR); Jongsoo Kim, Hwaseong-si (KR); Dong Kyu Kim, Suwon-si (KR); Hae Woong Kim, Seoul (KR); Changki Hong, Incheon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 31 days.

(21) Appl. No.: 15/825,984

(22) Filed: Nov. 29, 2017

(65) Prior Publication Data
US 2019/0047632 A1    Feb. 14, 2019

(30) Foreign Application Priority Data
Aug. 9, 2017    (KR) .......... 10-2017-0100943

(51) Int. Cl.
*B60N 5/00*    (2006.01)
*B62D 25/08*    (2006.01)
(Continued)

(52) U.S. Cl.
CPC .......... *B62D 25/088* (2013.01); *B60G 13/003* (2013.01); *B62D 25/16* (2013.01); *B62D 27/02* (2013.01)

(58) Field of Classification Search
CPC ...... B62D 25/088; B62D 25/16; B62D 27/02; B60G 13/003
See application file for complete search history.

(56) References Cited

U.S. PATENT DOCUMENTS 7,219,954 B2    5/2007    Gomi et al.
9,988,100 B2 *    6/2018    Kim .................. B62D 25/082
(Continued)

FOREIGN PATENT DOCUMENTS

| JP | 2007-131143 A | 5/2007 |
|---|---|---|
| KR | 10-2014-0024654 A | 3/2014 |
| KR | 10-2016-0148217 A | 12/2016 |

*Primary Examiner* — Lori L Lyjak
(74) *Attorney, Agent, or Firm* — Morgan Lewis & Bockius LLP

(57) ABSTRACT

A front vehicle body reinforcing structure includes: a shock absorber housing; a fender apron upper member connected to an upper end of an outer surface of the shock absorber housing in the width direction of the vehicle body; a front side member disposed inwardly in the width direction of the vehicle body at a lower portion of the fender apron upper member, and connected to a lower end of an inner surface of the shock absorber housing in the width direction of the vehicle body; and a fender apron member connecting the front side member and the fender apron upper member. The front side member and the fender apron member may form a three-dimensional box structure, and the fender apron member may be inserted into the front side member.

12 Claims, 10 Drawing Sheets

(51) Int. Cl.
*B60G 13/00* (2006.01)
*B62D 27/02* (2006.01)
*B62D 25/16* (2006.01)

(56) References Cited

U.S. PATENT DOCUMENTS

| | | | |
|---|---|---|---|
| 2016/0137227 A1* | 5/2016 | Kim | B62D 21/152 |
| | | | 296/204 |
| 2017/0043810 A1* | 2/2017 | Kim | B62D 21/09 |
| 2017/0158246 A1* | 6/2017 | Kang | B62D 25/081 |
| 2017/0166259 A1* | 6/2017 | Kim | B62D 25/082 |

* cited by examiner

FRONT VEHICLE BODY REINFORCING STRUCTURE

CROSS-REFERENCE TO RELATED APPLICATION

This application is based on and claims the benefit of priority to Korean Patent Application No. 10-2017-0100943 filed on Aug. 9, 2017 with the Korean Intellectual Property Office, the entire contents of which are incorporated herein by reference.

TECHNICAL FIELD

The present disclosure relates to a front vehicle body reinforcing structure. More particularly, the present disclosure relates to a front vehicle body reinforcing structure that may improve performance in coping with a head-on collision and a front small overlap collision of a vehicle.

BACKGROUND

Generally, a front vehicle body of a vehicle is a frame structure that is positioned at a front side of the vehicle in a longitudinal direction of the vehicle while forming an engine compartment, and includes a front end module that forms a front portion of the engine compartment and accommodates a cooling module, a head lamp, etc.; a front fender apron member that forms left and right portions of the engine compartment and in which wheels are installed; and a firewall which is positioned at a rear portion of the engine compartment and partitions a passenger compartment and the engine compartment.

Further, front side members extending in the longitudinal direction of the vehicle are disposed at left and right sides of an area below the engine compartment, respectively, to reinforce structural strength of the front vehicle body, and a sub-frame is disposed below the front side members so as to support the engine and a transmission at the engine compartment as well as a suspension system, etc.

At a front end of the front side members, a bumper beam extending in a width direction of the vehicle is installed so as to enhance the front collision response performance of the vehicle. The bumper beam is connected to the front end of the front side member in the longitudinal direction of the vehicle via a crash box.

When the vehicle provided with the front vehicle body having the above-described structure frontally collides with an object such as an obstacle or another vehicle in a small overlap while the vehicle is traveling, that is, when a collision object such as a small overlap barrier collides with an outer portion of the vehicle body in a state in which the collision object deviates to one side in a width direction of the vehicle, occupants cannot be safely protected because the collision object collides with an outer vehicle body portion with relatively weak rigidity in a state in which it deviates from the front side member and the front side member cannot effectively cope with the frontal small overlap collision of the vehicle, thereby causing an excessive collision damage to the vehicle.

To this end, methods for coping with the small overlap collision by reinforcing the outer portion of the vehicle body are being developed.

For example, extending a frontal front end portion of the front fender apron member to a frontal front end portion of the front side member, forming a structure in which connecting members are connected to each other or a structure in which a reinforcement member for preventing the collision object from breaking in is mounted on the outer side of the front side member, etc., are proposed, but it is not effective for coping with the front small overlap collision.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a front vehicle body reinforcing structure that may improve collision stability by absorbing impact energy applied to a front side member by a fender apron member and appropriately dispersing impact energy applied to the front side member and the fender apron member to other parts of a vehicle body when a vehicle is in a head-on collision, an offset collision, or a small overlap collision.

An exemplary embodiment of the present disclosure provides a front vehicle body reinforcing structure in which a shock absorber housing, a fender apron upper member, a fender apron member, and a front side member are disposed.

The front side member may include: an inner member forming a basic frame of a vehicle body extending in a length direction of the vehicle body; a front outer member disposed more outwardly than the inner member in a width direction of the vehicle body, disposed at a more frontal position than the fender apron member connected to the front side member, and forming a three-dimensional box structure by coupling with the inner member; and a rear outer member disposed more outwardly than the inner member in the width direction of the vehicle body, disposed in a more rearward position than the fender apron member connected to the front side member, and forming a three-dimensional box structure by coupling with the inner member.

The fender apron member may include: a base member forming a basic frame connecting the inner member and the fender apron upper member; a front member disposed more outwardly than the base member in the width direction of the vehicle body, and connected to a front end of the base member, a rear end of the front outer member, and the fender apron upper member; a rear member disposed more outwardly than the base member in the width direction of the vehicle body, and connected to a rear end of the base member, the front end of the rear outer member, and the fender apron upper member; and a cover member disposed more outwardly than the front member and the rear member in the width direction of the vehicle body, and connected to the front member, the rear member, the inner member, and the fender apron upper member.

The front member and the rear member may be inserted into a three-dimensional box structure of the front side member so as to be connected to an outer surface of the inner member in the width direction of the vehicle body.

The cover member may cover a space between the front member and the rear member.

The base member, the front member, the rear member, and the cover member may form a three-dimensional box structure.

A front end of some portions of the front member connected to an outer surface of the inner member may be welded to the outer surface of the inner member.

A rear end of the front outer member may be welded to the front member, and upper and lower ends thereof are welded to the inner member.

A rear end of some portions of the front member connected to the outer surface of the inner member may be welded to the outer surface of the inner member.

A rear end of some portions of the rear member connected to the outer surface of the inner member may be welded to the outer surface of the inner member.

A front end of the rear outer member may be welded to the rear member, and upper and lower ends thereof may be welded to the inner member.

A front end of the cover member may be welded to the front member, a rear end thereof may be welded to the rear member, an upper end thereof may be welded to the fender apron upper member, and a lower end thereof may be welded to the inner member.

Welding between the front end of some portions of the front member connected to the outer surface of the inner member and the outer surface of the inner member, welding for coupling the rear end of the front outer member to the front member and coupling the upper and lower ends of the front outer member to the inner member, welding for coupling the rear end of some portions of the front member connected to the outer surface of the inner member to the outer surface of the inner member, welding for coupling the rear end of some portions of the rear member connected to the outer surface of the inner member to the outer surface of the inner member, welding for coupling the front end of the rear outer member to the rear member and coupling the upper and lower ends of the rear outer member to the inner member, and welding for coupling the front end of the cover member to the front member, coupling the rear end of the cover member to the rear member, coupling the upper end of the cover member to the fender apron upper member, and coupling the lower end of the cover member to the inner member, may be sequentially performed.

Another embodiment of the present disclosure provides a front vehicle body reinforcing structure, including: a shock absorber housing; a fender apron upper member connected to an upper end of an outer surface of the shock absorber housing in the width direction of the vehicle body; a front side member disposed inwardly in the width direction of the vehicle body at a lower portion of the fender apron upper member, and connected to a lower end of an inner surface of the shock absorber housing in the width direction of the vehicle body; and a fender apron member connecting the front side member and the fender apron upper member.

The front side member and the fender apron member may form a three-dimensional box structure, and the fender apron member may be inserted into the front side member.

The front side member may include: an inner member forming a basic frame of a vehicle body extending in a length direction of the vehicle body; a front outer member disposed more outwardly than the inner member in a width direction of the vehicle body, disposed at a more frontal position than the fender apron member connected to the front side member, and coupled with the inner member; and a rear outer member disposed more outwardly than the inner member in the width direction of the vehicle body, disposed in a more rearward position than the fender apron member connected to the front side member, and coupled with the inner member.

The fender apron member may include: a base member forming a basic frame connecting the inner member and the fender apron upper member; a front member disposed more outwardly than the base member in the width direction of the vehicle body, connected to a front end of the base member, a rear end of the front outer member, and the fender apron upper member, and inserted into the three-dimensional box structure of the front side member so as to be connected to an outer surface of the inner member in the width direction of the vehicle body; a rear member disposed more outwardly than the base member in the width direction of the vehicle body, connected to a rear end of the base member, the front end of the rear outer member, and the fender apron upper member, and inserted into the three-dimensional box structure of the front side member so as to be connected to the outer surface of the inner member in the width direction of the vehicle body; and a cover member disposed more outwardly than the front member and the rear member in the width direction of the vehicle body, and connected to the front member, the rear member, the inner member, and the fender apron upper member.

DETAILED DESCRIPTION

An exemplary embodiment of the present disclosure will hereinafter be described in detail with reference to the accompanying drawings.

Figure 1:
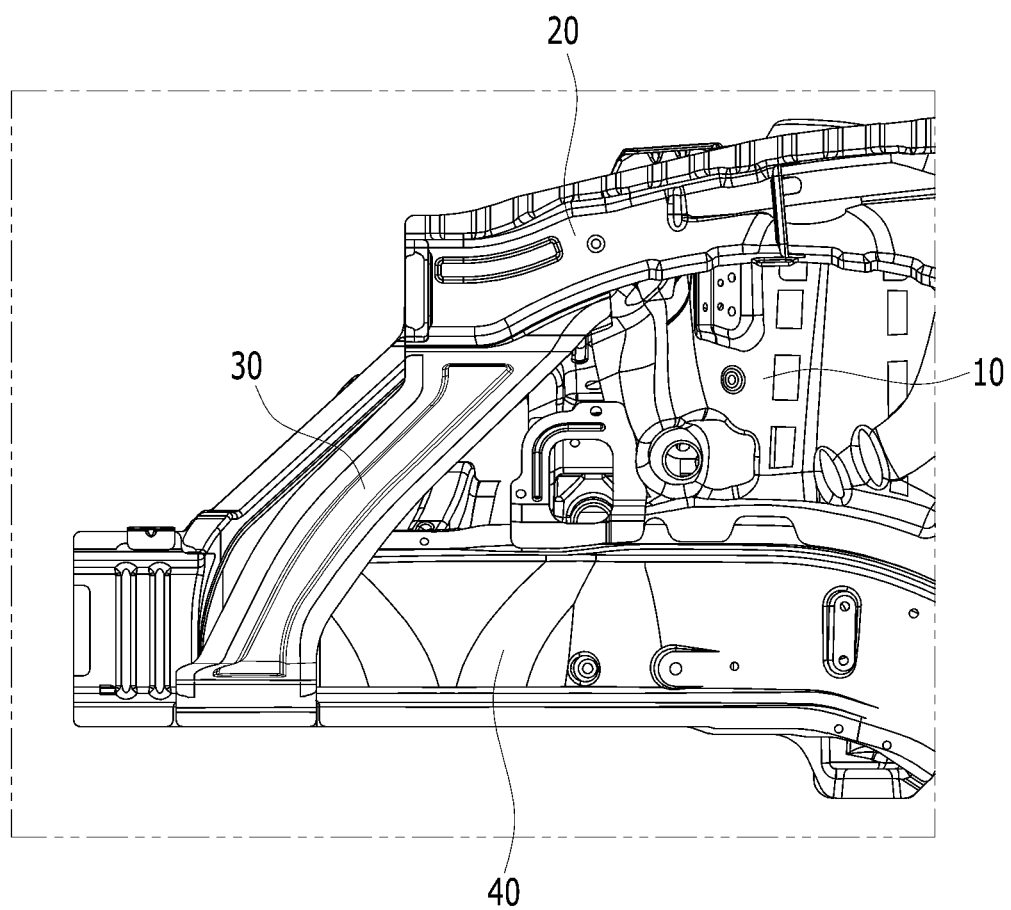
FIG. 1 illustrates a side view of a front vehicle body reinforcing structure according to an exemplary embodiment of the present disclosure.
Figure 2:
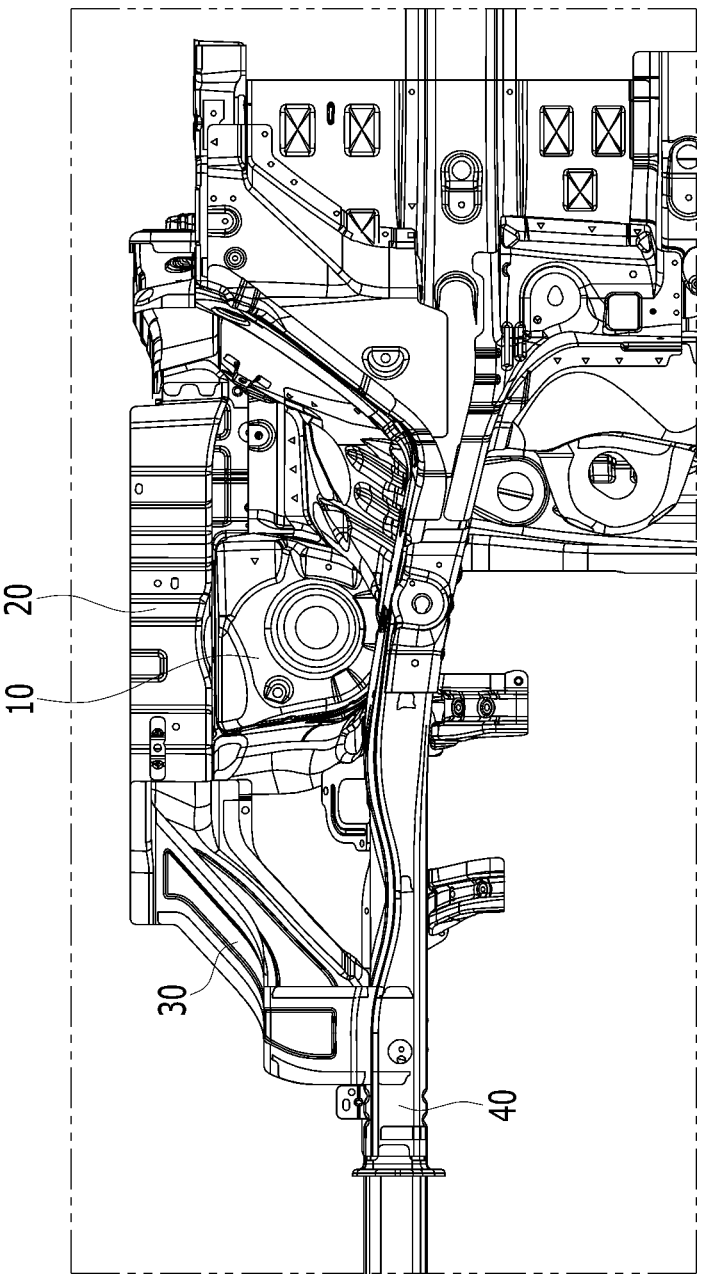
FIG. 2 illustrates a bottom view of a front vehicle body reinforcing structure according to an exemplary embodiment of the present disclosure.

FIG. 1 illustrates a side view of a front vehicle body reinforcing structure according to an exemplary embodiment of the present disclosure, and FIG. 2 illustrates a bottom view of a front vehicle body reinforcing structure according to an exemplary embodiment of the present disclosure.

As shown in FIG. 1 and FIG. 2, a front vehicle body reinforcing structure according to an exemplary embodiment of the present disclosure includes a shock absorber housing 10, a fender apron upper member 20, a fender apron member 30, and a front side member 40.

A shock absorber is mounted on the shock absorber housing 10. The shock absorber housing 10 is disposed to surround the shock absorber.

The fender apron upper member 20 is disposed at the outside of a cowl (not shown) based on a width direction of a vehicle body and connected to an upper end of an outer surface of the shock absorber housing 10 based on the width direction of the vehicle body.

The front side member 40 is disposed at a lower portion of the fender apron upper member 20, is disposed at the inside of the fender apron upper member 20 based on the width direction of the vehicle body, and is connected to a lower end of an inner surface of the shock absorber housing 10 based on the width direction of the vehicle body.

The fender apron member 30 connects the front side member 40 and the fender apron upper member 20. When a head-on collision, an offset collision, or a small overlap collision occurs, the fender apron member 30 functions to disperse a collision load applied to the front side member 40 (which extends in a longitudinal direction of the vehicle body).

Here, it is well known to a person of ordinary skill in the art (hereinafter referred to as those skilled in the art) that the offset collision means a partial head-on collision, and the small overlap collision means a local partial collision in which most of the collision load is applied to one side of the front side member 40 among the offset collision. In addition, substantial structures and functions of the shock absorber housing 10, the fender apron upper member 20, the fender apron member 30, and the front side member 40 will be well known to those skilled in the art, so a description thereof will be omitted.

Figure 3:
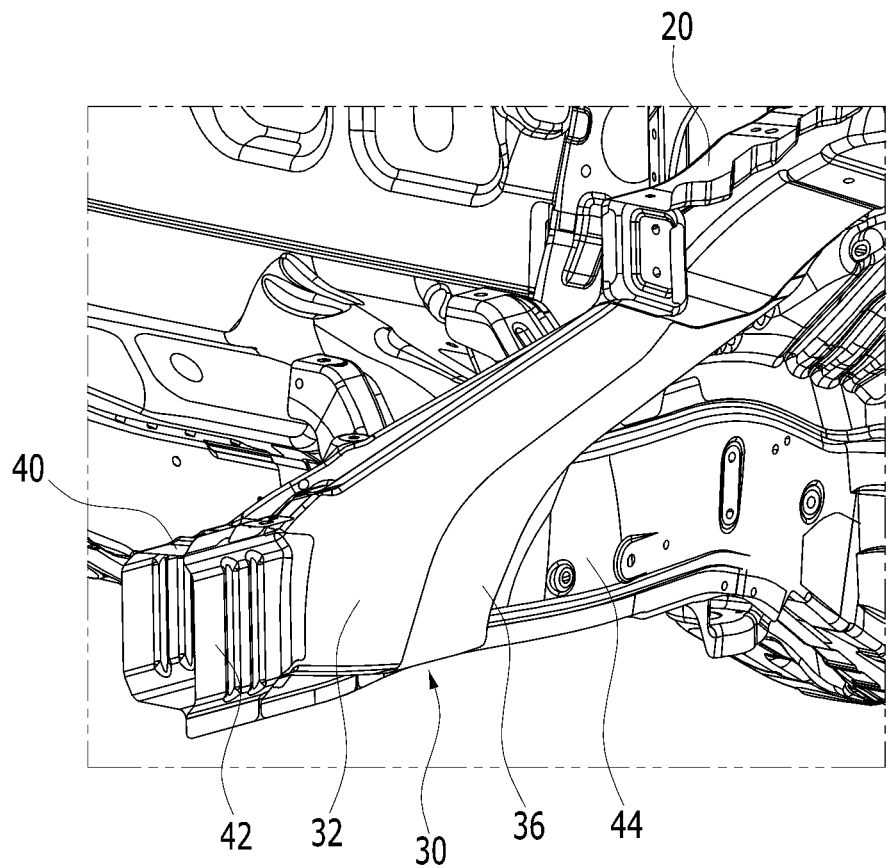
FIG. 3 illustrates a perspective view of a front vehicle body reinforcing structure according to an exemplary embodiment of the present disclosure.

FIG. 3 illustrates a perspective view of a front vehicle body reinforcing structure according to an exemplary embodiment of the present disclosure.

As shown in FIG. 3, the fender apron member 30 is provided to have a three-dimensional box structure and is inserted into the front side member 40 having a three-dimensional box structure.

Hereinafter, a coupling structure of the three-dimensional box structure of the front side member 40 and a three-dimensional box structure of the fender apron member 30 will be described with reference to FIG. 4 to FIG. 9.

FIG. 4 to FIG. 9 are schematic views for showing a manufacturing method of a front vehicle body reinforcing structure according to an exemplary embodiment of the present disclosure.

Referring to FIG. 4 to FIG. 9, the front side member 40 includes an inner member 41, a front outer member 42, and a rear outer member 44, and the fender apron member 30 includes a base member 31, a front member 32, a rear member 34, and a cover member 36.

The inner member 41 is disposed at the front side member 40 relatively inward based on a width direction of the vehicle body. In addition, the inner member 41 forms a basic frame of the front side member 40 extending in a longitudinal direction of the vehicle body.

The front outer member 42 and the rear outer member 44 are disposed more outwardly than the inner member 41 based on the width direction of the vehicle body. In addition, the front outer member 42 and the rear outer member 44 are combined with the inner member 41 to form the three-dimensional box structure of the front side member 40. Further, the front outer member 42 is disposed in front of the fender apron member 30 connected to the front side member 40, and the rear outer member 44 is disposed in back of the fender apron member 30 connected to the front side member 40.

The base member 31 is disposed at the fender apron member 30 relatively inward based on the width direction of the vehicle body. In addition, the base member 31 connects the inner member 41 and the fender apron upper member 20, and it forms a basic frame of the fender apron member 30 connecting the front side member 40 and the fender apron upper member 20.

The front member 32 is disposed at the fender apron member 30 more outwardly than the base member 31 based on the width direction of the vehicle body. In addition, the front member 32 is connected to a front end of the base member 31, a rear end of the front outer member 42, and the fender apron upper member 20. Further, the front member 32 is inserted into the three-dimensional box structure of the front side member 40 to be connected to an outer surface of the inner member 41 based on the width direction of the vehicle body, that is, an inner surface of the three-dimensional box structure of the front side member 40.

The rear member 34 is disposed at the fender apron member 30 more outwardly than the base member 31 based on the width direction of the vehicle body. In addition, the rear member 34 is connected to a rear end of the base member 31, a front of the rear outer member 44, and the fender apron upper member 20. That is, the rear member 34 is disposed at the fender apron member 30 more rearwardly than the front member 32 based on a length direction of the vehicle body. Further, the rear member 34 is inserted into the three-dimensional box structure of the front side member 40 to be connected to an outer surface of the inner member 41 based on the width direction of the vehicle body, that is, an inner surface of the three-dimensional box structure of the front side member 40.

The cover member 36 is disposed at the fender apron member 30 more outwardly than the front member 32 and the rear member 34 based on the width direction of the vehicle body. In addition, the cover member 36 is respectively connected to the front member 32, the rear member 34, the inner member 41, and the fender apron upper member 20 so that a space between the front member 32 and the rear member 34 is covered. Accordingly, the base member 31, the front member 32, the rear member 34, and the cover member 36 form a three-dimensional box structure.

Figure 4:
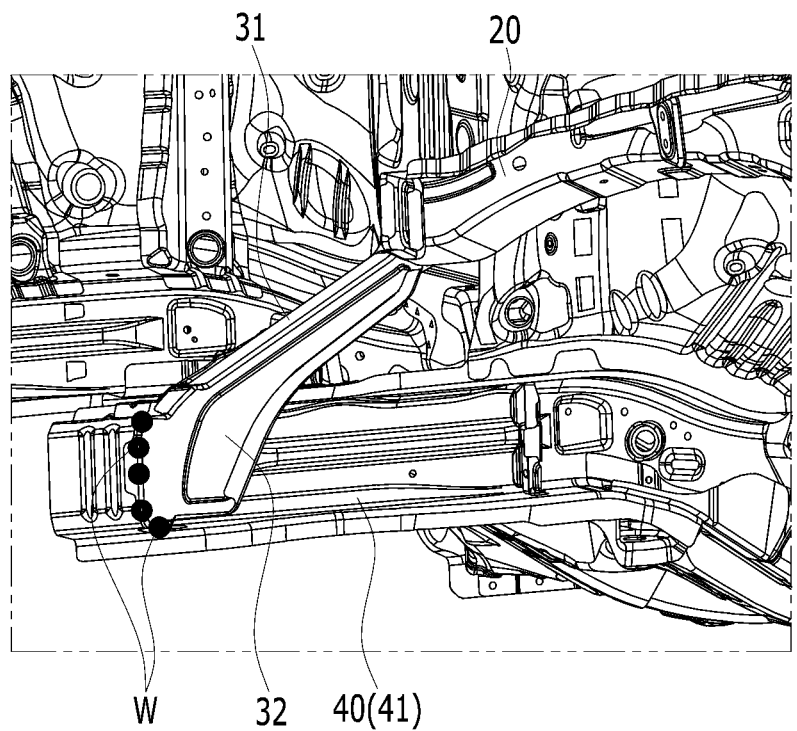
FIG. 4 to FIG. 9 are schematic views for showing a manufacturing method of a front vehicle body reinforcing structure according to an exemplary embodiment of the present disclosure.

As shown in FIG. 4, in the state in which the front member 32 is disposed as described above, a front end of some portions of the front member 32 connected to an outer surface of the inner member 41 is welded to an outer surface of the inner member 41. In FIG. 4 to FIG. 9, welding portions (W) welded are denoted by circular dots.

Figure 5:
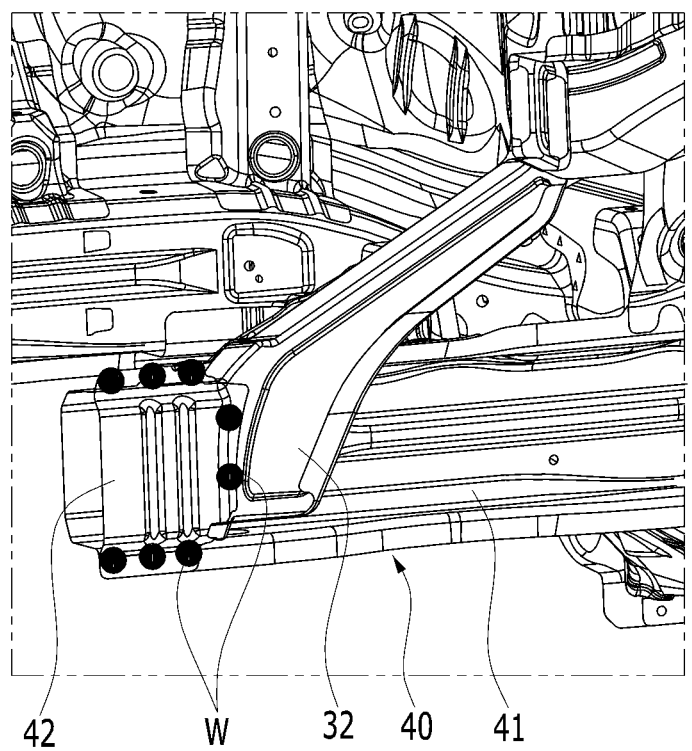

As shown in FIG. 5, when the welding of FIG. 4 is completed, a rear end of the front outer member 42 is welded to the front member 32 in the state in which the front outer member 42 is disposed as described above, and upper and lower ends of the front member 32 are welded to the inner member 41.

Figure 6:
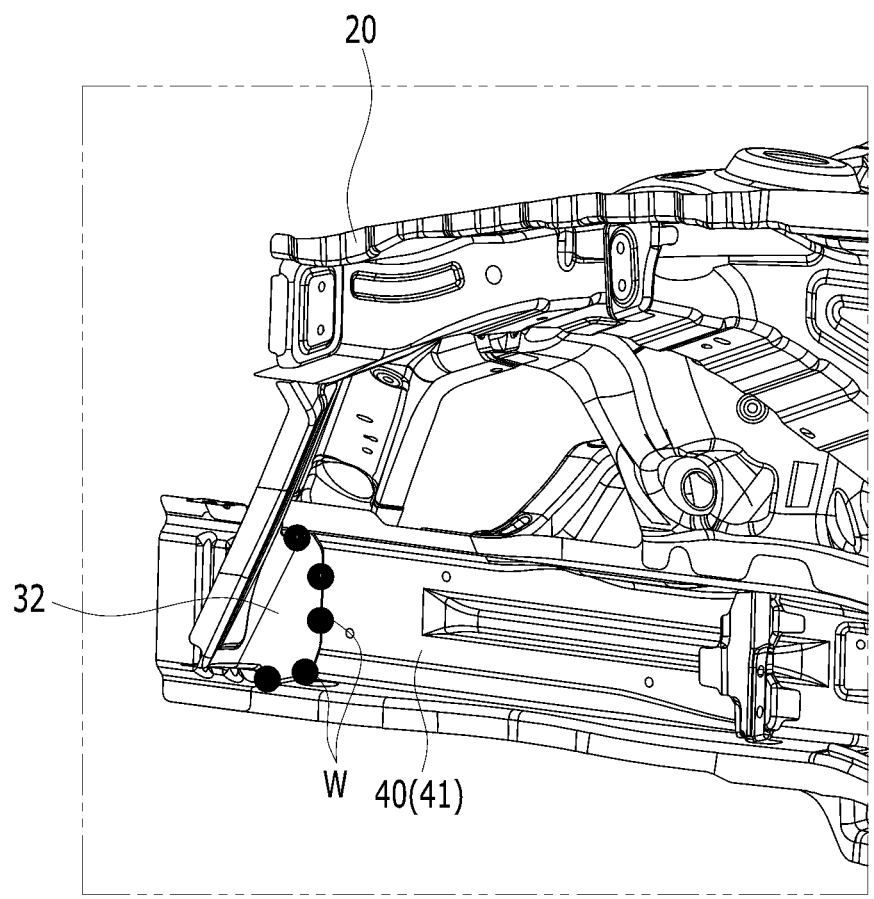

As shown in FIG. 6, when the welding of FIG. 5 is completed, a rear end of some portions of the front member 32 connected to an outer surface of the inner member 41 is welded to an outer surface of the inner member 41.

Figure 7:
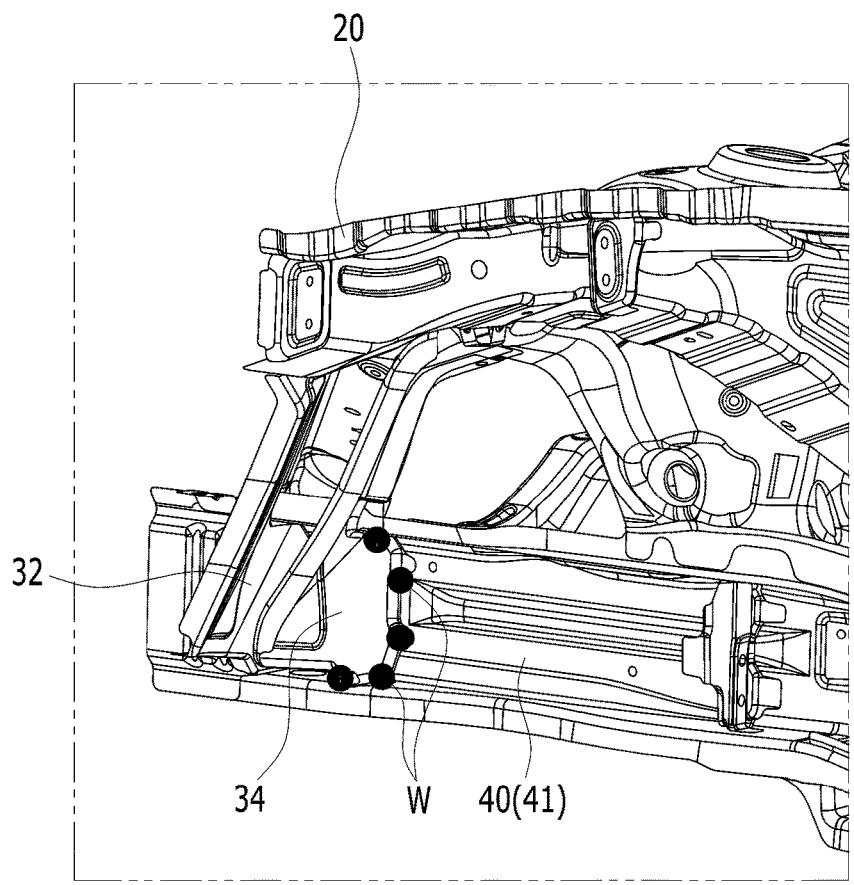

As shown in FIG. 7, when the welding of FIG. 6 is completed, a rear end of some portions of the rear member 44 connected to an outer surface of the inner member 41 is welded to an outer surface of the inner member 41 in a state in which the rear member 44 is disposed as described above.

Figure 8:
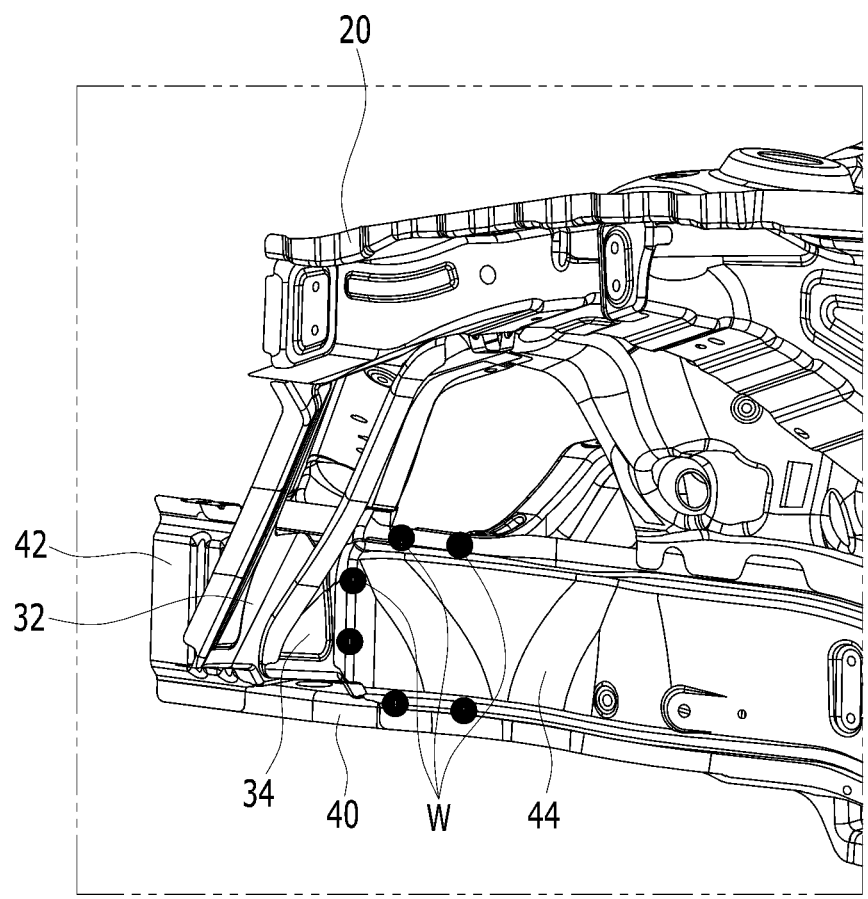

As shown in FIG. 8, when the welding of FIG. 7 is completed, in a state in which the rear outer member 44 is disposed as described above, a front end of the rear outer member 44 is welded to the rear member 44, and upper and lower ends of the rear outer member 44 are welded to the inner member 41.

Figure 9:
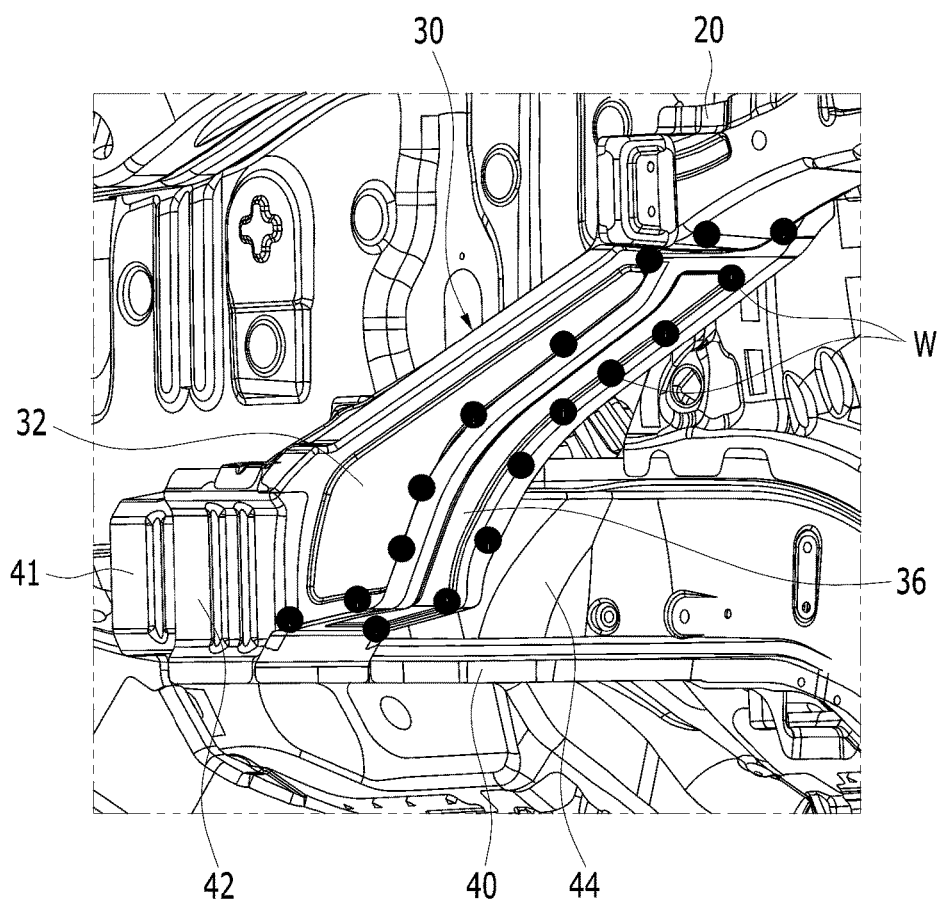

As shown in FIG. 9, when the welding of FIG. 8 is completed, in a state in which the cover member 36 is disposed as described above, a front end of the cover member 36 is welded to the front member 32, a rear end of the cover member 36 is welded to the rear member 44, an upper end of the cover member 36 is welded to the fender apron upper member 20, and a lower end of the cover member 36 is welded to the inner member 41. Therefore, the front vehicle body reinforcing structure according to the exemplary embodiment of the present disclosure is formed.

Figure 10:
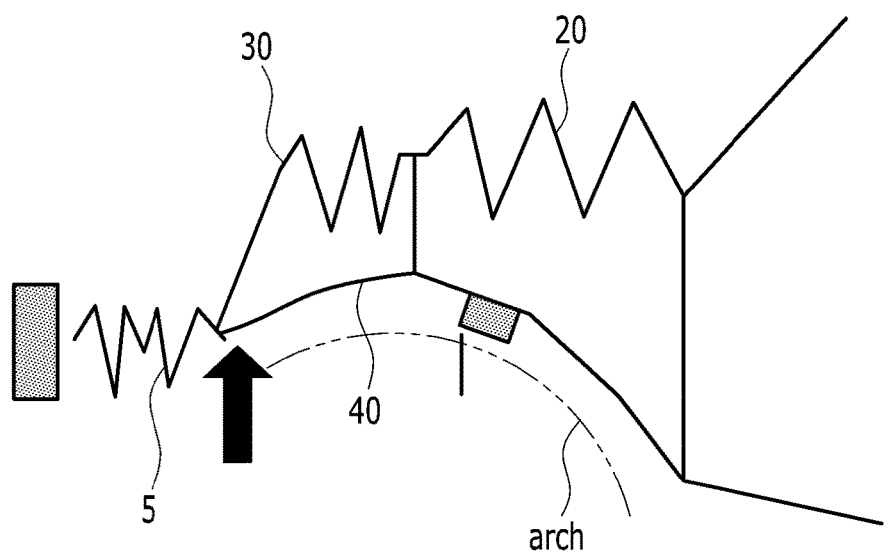
FIG. 10 schematically illustrates a state in which is a front vehicle body reinforcing structure according to an exemplary embodiment of the present disclosure is deformed at a moment of collision.

FIG. 10 schematically illustrates a state in which is a front vehicle body reinforcing structure according to an exemplary embodiment of the present disclosure is deformed at a moment of collision.

As shown in FIG. 10, according to the front vehicle body reinforcing structure according to the exemplary embodiment of the present disclosure, when a front collision, an offset collision, or a small overlap collision occurs, a front vehicle body 5, the fender apron member 30, and the fender apron upper member 20 are buckled more than the fender apron member 30, while forming relatively uniformly repeated "Z" shapes, thereby absorbing impact. In addition, the front side member 40 is buckled in an arch shape due to deformation of the front vehicle body 5, the fender apron member 30, and the fender apron upper member 20, and the collision energy is converted into kinetic energy lifting the vehicle body, thereby reducing impact. Further, such a deformation, when the offset collision or the small overlap collision occurs, induces the body to rotate in a single direction, increasing an amount of collision energy converted into kinetic energy.

As described above, according to the exemplary embodiment of the present disclosure, by fully inserting the fender apron member 30 into the front side member 40, a capability of the fender apron member 30 for absorbing impact energy transmitted to the front side member 40 may be improved. In addition, since the three-dimensional box structure of the front side member 40 and a three-dimensional box structure of the fender apron member 30 are coupled by the inserting, structural rigidity may be increased. Further, since an amount of impact energy converted into kinetic energy increases, it is possible to reduce impact transmitted to a passenger compartment.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A front vehicle body reinforcing structure in which a shock absorber housing, a fender apron upper member, a fender apron member, and a front side member are disposed, wherein
the front side member includes:
an inner member forming a basic frame of a vehicle body extending in a length direction of the vehicle body;
a front outer member disposed more outwardly than the inner member in a width direction of the vehicle body, disposed at a more frontal position than the fender apron member connected to the front side member, and forming a three-dimensional box structure by coupling with the inner member; and
a rear outer member disposed more outwardly than the inner member in the width direction of the vehicle body, disposed in a more rearward position than the fender apron member connected to the front side member, and forming a three-dimensional box structure by coupling with the inner member, and
the fender apron member includes:
a base member forming a basic frame connecting the inner member and the fender apron upper member;
a front member disposed more outwardly than the base member in the width direction of the vehicle body, and connected to a front end of the base member, a rear end of the front outer member, and the fender apron upper member;
a rear member disposed more outwardly than the base member in the width direction of the vehicle body, and connected to a rear end of the base member, the front end of the rear outer member, and the fender apron upper member; and
a cover member disposed more outwardly than the front member and the rear member in the width direction of the vehicle body, and connected to the front member, the rear member, the inner member, and the fender apron upper member,
wherein the front member and the rear member are inserted into a three-dimensional box structure of the front side member so as to be connected to an outer surface of the inner member in the width direction of the vehicle body.

2. The front vehicle body reinforcing structure of claim 1, wherein
the cover member covers a space between the front member and the rear member.

3. The front vehicle body reinforcing structure of claim 2, wherein
the base member, the front member, the rear member, and the cover member form a three-dimensional box structure.

4. The front vehicle body reinforcing structure of claim 1, wherein
a front end of some portions of the front member connected to an outer surface of the inner member is welded to the outer surface of the inner member.

5. The front vehicle body reinforcing structure of claim 1, wherein
a rear end of the front outer member is welded to the front member, and upper and lower ends thereof are welded to the inner member.

6. The front vehicle body reinforcing structure of claim 1, wherein
a rear end of some portions of the front member connected to the outer surface of the inner member is welded to the outer surface of the inner member.

7. The front vehicle body reinforcing structure of claim 1, wherein
a rear end of some portions of the rear member connected to the outer surface of the inner member is welded to the outer surface of the inner member.

8. The front vehicle body reinforcing structure of claim 1, wherein
a front end of the rear outer member is welded to the rear member, and upper and lower ends thereof are welded to the inner member.

9. The front vehicle body reinforcing structure of claim 1, wherein
a front end of the cover member is welded to the front member, a rear end thereof is welded to the rear member, an upper end thereof is welded to the fender apron upper member, and a lower end thereof is welded to the inner member.

10. The front vehicle body reinforcing structure of claim 1, wherein
welding between the front end of some portions of the front member connected to the outer surface of the inner member and the outer surface of the inner member, welding for coupling the rear end of the front outer member to the front member and coupling the upper and lower ends of the front outer member to the inner member, welding for coupling the rear end of some portions of the front member connected to the outer surface of the inner member to the outer surface of the inner member, welding for coupling the rear end of some portions of the rear member connected to the outer surface of the inner member to the outer surface of the inner member, welding for coupling the front end of the rear outer member to the rear member and coupling the upper and lower ends of the rear outer member to the inner member, and welding for coupling the front end of the cover member to the front member, coupling the rear end of the cover member to the rear member, coupling the upper end of the cover member to the fender apron upper member, and coupling the lower end of the cover member to the inner member, are sequentially performed.

11. A front vehicle body reinforcing structure, comprising:
a shock absorber housing;
a fender apron upper member connected to an upper end of an outer surface of the shock absorber housing in a width direction of the vehicle body;
a front side member disposed inwardly in the width direction of the vehicle body at a lower portion of the fender apron upper member, and connected to a lower end of an inner surface of the shock absorber housing in the width direction of the vehicle body; and
a fender apron member connecting the front side member and the fender apron upper member,
wherein the front side member and the fender apron member form a three-dimensional box structure, and the fender apron member is inserted into the front side member.

12. The front vehicle body reinforcing structure of claim 11, wherein
the front side member includes:
an inner member forming a basic frame of a vehicle body extending in a length direction of the vehicle body;
a front outer member disposed more outwardly than the inner member in the width direction of the vehicle body, disposed at a more frontal position than the fender apron member connected to the front side member, and coupled with the inner member; and
a rear outer member disposed more outwardly than the inner member in the width direction of the vehicle body, disposed in a more rearward position than the fender apron member connected to the front side member, and coupled with the inner member,
the fender apron member includes:
a base member forming a basic frame connecting the inner member and the fender apron upper member;
a front member disposed more outwardly than the base member in the width direction of the vehicle body, connected to a front end of the base member, a rear end of the front outer member, and the fender apron upper member, and inserted into the three-dimensional box structure of the front side member so as to be connected to an outer surface of the inner member in the width direction of the vehicle body;
a rear member disposed more outwardly than the base member in the width direction of the vehicle body, connected to a rear end of the base member, the front end of the rear outer member, and the fender apron upper member, and inserted into the three-dimensional box structure of the front side member so as to be connected to the outer surface of the inner member in the width direction of the vehicle body; and
a cover member disposed more outwardly than the front member and the rear member in the width direction of the vehicle body, and connected to the front member, the rear member, the inner member, and the fender apron upper member.

* * * * *